June 30, 1931.     E. HELIN     1,812,785
CURVE THREADED NUT
Filed Feb. 21, 1929

INVENTOR:
Elis Helin
BY: Reug, Bayer & Bakelan
ATTORNEYS.

Patented June 30, 1931

1,812,785

UNITED STATES PATENT OFFICE

ELIS HELIN, OF STOCKHOLM, SWEDEN

CURVE THREADED NUT

Application filed February 21, 1929, Serial No. 341,589, and in Sweden March 7, 1928.

My present invention refers to lock-nuts and has for its principal object to provide a nut for this purpose which is perfectly reliable in use, of simple shape, making any additional securing means as for instance counter-nuts, fibre packings or the like superfluous. As it is furthermore cheap in manufacture it is decidedly superior to lock-nuts now in use.

Another object of my invention is to provide a nut having a threaded bore on an arcuate axis in which the bisectors of the thread vertex angles and those of the thread base angles are parallel throughout the whole thread in spite of the curvature of the nut-hole.

Figure 1:
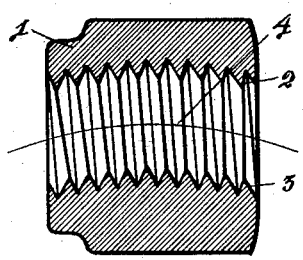
Figure 2:
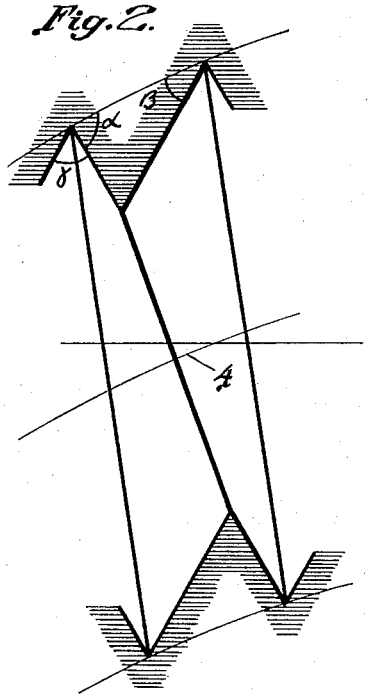

In the accompanying drawings Fig. 1 is a longitudinal sectional view of a nut made according to the present invention, the arc of the threaded opening being exaggerated for clarity of illustration; and Fig. 2 is a diagrammatic sectional view illustrating one of the spires of the nut on an enlarged scale.

In the form shown in Fig. 1 imaginary lines drawn through the tops of the several spires in the nut-half 1 from the concave side 2 of the nut-hole to the convex side 3, converge to a point at the side of the centre of the arc 4, and consequently the number of spires is less on the concave side 2 of the nut-hole than on the convex side 3.

The nut may be produced by means of a cutter rotating in a plane perpendicular to its axis of rotation, whereas the nut-blank is moved parallel to itself along an arc corresponding to the desired curve of the thread, as more fully described in my co-pending applications Serial Nos. 256,531 and 401,442, filed respectively February 24, 1928 and October 22, 1929, it being understood, however, that the improved nut may be produced by other methods. The profile of the thread in cross-section will, therefore, be of regular form at one point, for instance the centre of the nut, where the cutter has moved tangentially to the arc 4, whereas the spires on each side of said point in the direction towards the bent walls 2 and 3 of the nut hole will in cross-section assume the form of scalene triangles in which the difference between the base-angles $\alpha$ and $\beta$ is greater the farther the spire lies from said point. The tops of the spires are oppositely directed on the concave and the convex sides of the nut-hole, see Fig. 2. The angle $\gamma$ between two consecutive spire-sides is constant throughout the whole length of the thread.

Applicant is aware that curve threaded nuts have heretofore been suggested. Such nuts, however, have been made by first cutting the thread in the nut blank in the usual manner and then bending the threaded nut. It is evident that such a nut will have a profile deviating from the regular form, that is to say, the spires will be deformed on account of the bending, such deformation being oppositely directed on the concave and the convex sides of the nut-hole. The angle between two consecutive spires-sides will vary in each separate spire. The nut according to my present invention is characterized by the fact that the base-angle between two consecutive spire-sides is constant throughout the whole nut in spite of the curvature of the nut-hole.

Having now described my invention, what I claim as new and desire to secure by Letters Patent is:—

1. A nut having a threaded bore on an arcuate axis in which the angle between two consecutive spire-sides is constant throughout the whole thread and the cross-section of one of the spires in the plane of said axis is at one point of regular profile, whereas the other spires in said plane have the cross-sectional form of scalene triangles.

2. A nut having a threaded bore on an arcuate axis in which the angle between two consecutive spire-sides is constant throughout the whole thread and the cross-section of one of the spires in the plane of said axis is at one point of regular profile, whereas the other spires in said plane have the cross-sectional form of scalene triangles, the difference between the base-angles of said triangles being greater the farther the spire lies from said point.

3. A nut having a threaded bore on an arcuate axis in which the bisectors of the thread vertex angles are parallel throughout the whole thread.

4. A nut having a threaded bore on an arcuate axis in which the bisectors of the thread vertex angles and those of the thread base angles are parallel throughout the whole thread.

In testimony whereof I have signed my name to this specification.

ELIS HELIN.